United States Patent [19]

Searle et al.

[11] 3,751,639

[45] Aug. 7, 1973

[54] CARD READER SYSTEM

[75] Inventors: John L. Searle, Newport; Donald B. Hampton, Middletown, both of R.I.

[73] Assignee: Raytheon Company, Lexington, Mass.

[22] Filed: June 8, 1972

[21] Appl. No.: 261,123

Related U.S. Application Data

[63] Continuation of Ser. No. 68,088, Aug. 31, 1970, abandoned.

[52] U.S. Cl... 235/61.11 E, 250/219 D, 340/149 A, 235/61.7 B

[51] Int. Cl. .... G06r 7/10

[58] Field of Search .... 178/30; 235/61.11 E, 235/61.11 D, 61.7 B; 340/149, 149 A, 172.5, 20, 22, 24; 250/219 D, 219 DC

[56] References Cited

UNITED STATES PATENTS

| | | | |
|---|---|---|---|
| 3,225,175 | 12/1965 | Hyypolainen | 235/61.7 |
| 3,238,501 | 3/1966 | Mak et al. | 235/61.11 E |
| 3,328,589 | 6/1967 | Ferguson | 250/219 DC |
| 3,419,710 | 12/1968 | Mathews, Jr. et al. | 340/149 A |
| 3,444,358 | 5/1969 | Malone | 235/61.11 E |
| 3,456,117 | 7/1969 | Ritzert et al. | 235/61.11 E |
| 3,508,207 | 4/1970 | Shigaki | 340/172.5 |
| 3,559,175 | 1/1971 | Pomeroy | 235/61.7 B |
| 3,560,751 | 12/1971 | Buettner et al. | 250/219 DC |
| 3,562,494 | 2/1971 | Schmidt | 235/61.11 E |

*Primary Examiner*—Thomas A. Robinson
*Attorney*—Milton D. Bartlett et al.

[57] ABSTRACT

A card reader system in which a combination of data indicia, and clocking and timing indicia are present simultaneously on a coded card, for example, an identity card or boarding pass, which is insertable into the card reader. As a card is inserted, clock pulses are generated in accordance with the clock markings on the card which clock data is sensed from the coding, and is transferred into a shift register at a variable clock rate and from the shift register into a central computer at a different clock rate.

5 Claims, 7 Drawing Figures

3 Sheets-Sheet 1

CARD READER SYSTEM

This is a continuation of application Ser. No. 68,088 filed Aug. 31, 1970 and now abandoned.

REFERENCE TO RELATED CASES

Application Ser. No. 19,190, filed Mar. 13, 1970 of Joseph E. Bryden, titled Visual Display System; now U.S. Pat. No. 3,697,955 which issued on Oct. 10, 1972, application Ser. No. 41,344, filed May 28, 1970 of William J. Bickford, titled Demand Access Digital Communications System, now U.S. Pat. No. 3,633,169 which issued on Jan. 4, 1972, and application Ser. No. 35,375, filed May 7, 1970 of John L. Searle, titled Frequency Band Converter are all assigned to the same assignee as the present application and are hereby incorporated herein by reference.

BACKGROUND AND SUMMARY OF THE INVENTION

This invention relates to a card reader system for the reading, storage, control and utilization of digitally coded cards, such as credit cards, identification cards and airline boarding passes in a system which may be used with or without a computer. More specifically, in card readers of the prior art, internally generated clock signals are employed, resulting in additional circuit complexity and added cost plus lack of flexibility since such circuitry cannot accommodate changing clock speeds. Thus, card readers of the prior art receive coded cards at only one speed and as such, the cards must be either machine rolled through the card reader or held in place while read, thereby precluding hand insertion of the cards as in the present invention.

Since the card, which may be a boarding pass, is put through the reader by hand, a motor drive and rollers are eliminated which additionally increases the relaibility of the unit. Furthermore, the speed of movement of passengers past the boarding pass reader is increased since passengers can move a boarding pass through the reader in about two seconds rather than an estimated fifteen seconds per passenger with a unit which has a motor drive system. The motor drive concept requires a passenger to insert the boarding pass in a slot, wait while the pass is being read and then remove the pass from the other end of the unit. Additionally, the boarding pass reader of the present invention can read a crumpled or folded boarding pass which has been unfolded and pushed through the unit.

An additional problem of the prior art is the provision of a sufficient amount of diffused light in an optical card reader. This problem is overcome in the present invention by the provision of edge lighting by transmission of light through a lucite block which is then reflected from a card to be read and which impinges only on the sensitive surfaces of a pair of phototransistors. By the provision of both clock and data codes on the same card, data may be read at varying speeds as would occur when passengers push a card by hand through the system. Furthermore, the data and clock indicia are one and the same mark on the coded card, therefore any variation of the clock rate also varies the data rate; hence, loss of synchronism will not occur.

While an optical card reader is described in the specific embodiment, it is to be understood that the techniques of the present invention could apply equally well to magnetic or punched hole type card readers and to embossed code card readers.

An additional problem of the prior art is the transfer of data from a shift register to a central computer or other data storage medium at a speed other than that at which data is read into the register. In the past, buffer registers and other devices have been used; however, this results in undue circuit complexity and additional system cost. The present invention provides a system for reading data into a shift register at one clock rate and shifting it out of the register at a different and faster clock rate without loss of data.

It is therefore an object of this invention to provide a card reader system for use with coded cards in which the coded cards may be inserted at varying speeds into the reader.

It is an additional object of this invention to provide a card reader system in which both clock and data codes are present simultaneously on the card to be read and in which the same indicia may be used for both clock and data coding.

It is yet an additional object of this invention to provide a card reader system in which an internal clock is not required and in which system synchronization is maintained independent of the rate at which data is received or transferred out of the system.

It is yet an additional object of this invention to provide a hand-fed boarding pass reader for airline use.

It is yet an additional object of this invention to provide a data transfer system in which data may be transferred into a storage medium, which may be shift register, at a first clock rate and then transferred out of the register at a second clock rate.

It is yet an additional object of this invention to provide an optical reading head for simultaneously reading data and clock codes in which an improved optical lighting system is provided.

It is yet an additional object of this invention to provide improved synchronization circuitry in an optical card reader such that misaligned or misprinted data or clock pulses will not affect the system operation.

The aforementioned objects and advantages are satisfied in an embodiment comprising a central computer to which card reader information may be inputted and from which information is transferred to a visual display and to various utilization devices, such as turnstiles and other equipment at, for example, airports.

BRIEF DESCRIPTION OF THE DRAWINGS

Further objects and advantages of the invention will become apparent from the following specification taken in connection with the accompanying drawings wherein like reference characters identify parts of like function throughout the different views thereof.

DESCRIPTION OF THE PREFERRED EMBODIMENT

Figures 1, 2:
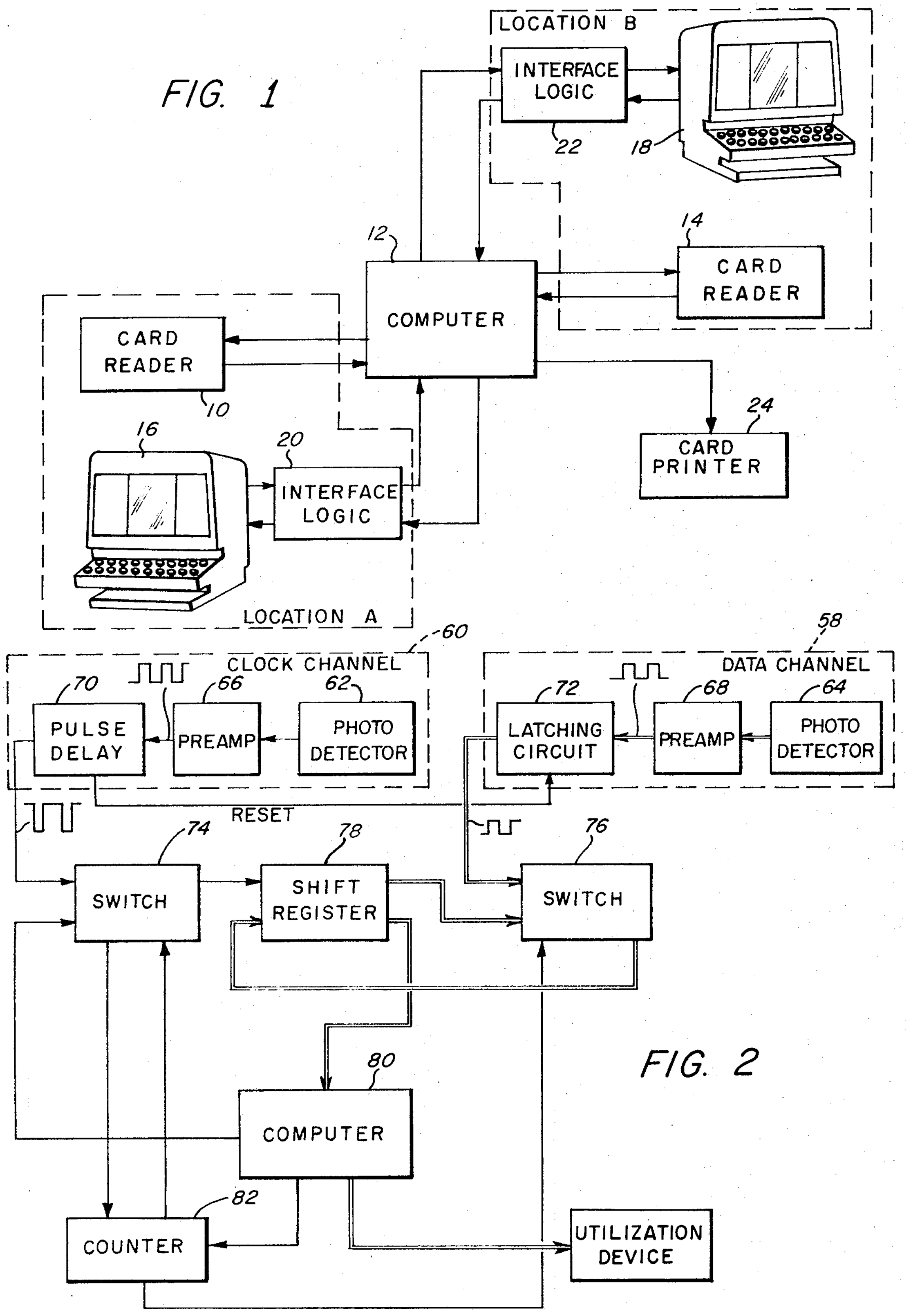
FIG. 1 is a block diagram of a card reading and communications system embodying the present invention.
FIG. 2 is a block diagram of a specific embodiment of the card reader of the present invention.

Referring now to FIG. 1, there is disclosed a card reader system in which the principles of the present invention are embodied. A card reader 10, which is described in detail in FIGS. 2 through 7, is used to optically read a coded data card insertable therein, such as a boarding pass commonly used, without coding, by the airlines. The card reader is adapted to read the card regardless of the speed with which it is moved through the reader by hand, since the coded indicia on the card contain both data and clock coding to provide synchronization of clock and data pulse trains independent of the clock or data rates.

In the event that information is not required to be stored in a computer, the card reader output could simply be adapted to provide signals to, for example, open the turnstile of an airplane boarding gate as passengers pass their coded boarding passes through the card reader. Of course, the codes could effectively be changed from day to day to maintain code integrity when desired.

In the embodiment illustrated by FIG. 1, once the coding is read from the card by card reader 10 at a first location, location A, the information contained on the card or boarding pass is inputted to a central computer 12 for storage. Similarly, a card reader 14 at a second location, location B, which may be another boarding gate, reads the code on another card or boarding pass, which is then inputted to the central computer 12. Any desired number of card readers can of course be employed. While the system described is an optical card reading system, it is to be understood that magnetic readers used in conjunction with magnetic codes, embossed code readers used with embossed codes, punched card data systems and embossed character data card systems could all be configured to use the particular features of the present invention. More specifically, the coding of clock information in a one to one correspondence with data on a card and a system adaptable to utilize this approach to the synchronization problem may be embodied in the above mentioned alternative types of card reader systems.

Alphanumeric displays 16 and 18 associated with card readers 10 and 14 respectively at locations A and B are used to display information in accordance with the coding on the cards, and various data stored in computer 12 such as flight number, destination, seat availability, etc. may be displayed. The display and display interface logic 20 and 22 may be of the type disclosed in the aforementioned Bryden and Bickford applications copending herewith. A data teleprinter 24 is fed from computer 12 when printed information is required, such as the printing of tickets for airline passengers.

Figures 4, 5, 7:
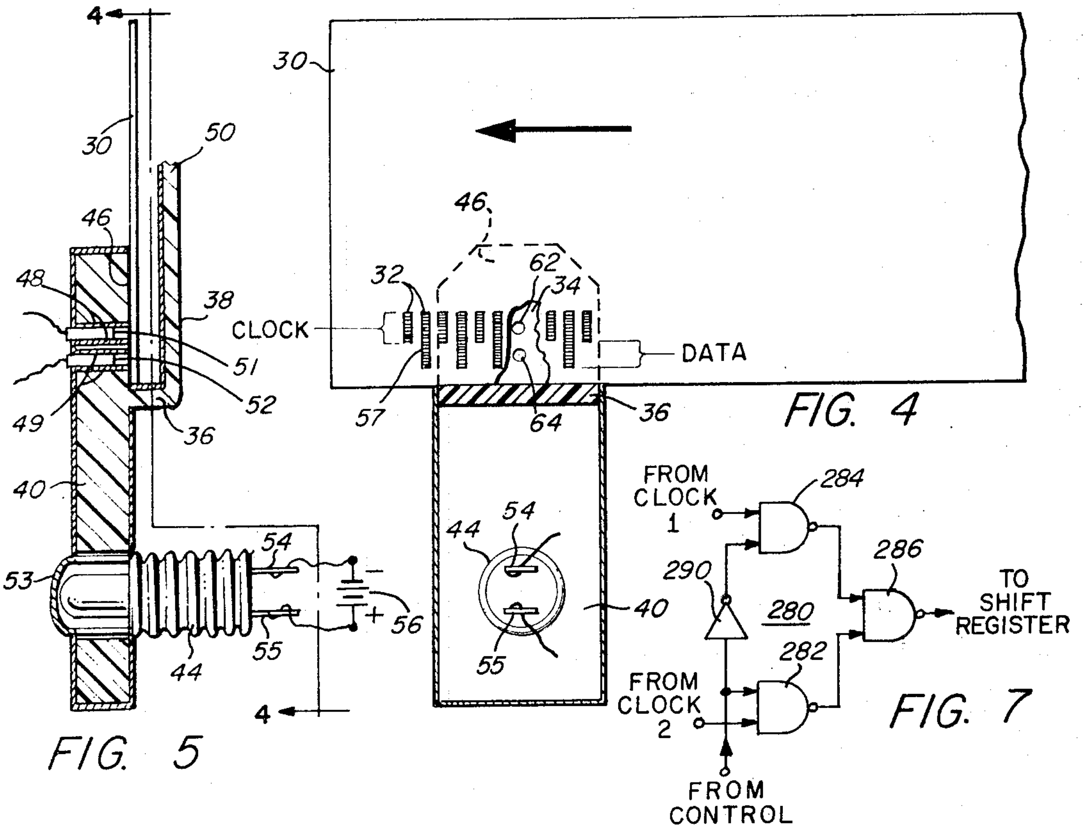
FIG. 4 and 5 are views of the card reading head of the present invention, with FIG. 4 showing a view of FIG. 5 along line 4—4.
FIG. 7 is a logic circuit which may be used in the block diagram shown in FIG. 2.

Referring now to FIG. 2, a system for reading data on a coded card in accordance with the present invention is disclosed. When the coded portions of a data card such as those illustrated by the card of FIG. 4 is moved in front of photodetectors 62 and 64, light is either reflected from the relatively light background or not reflected by the coded markings thereon, thus either generating signals or not generating signals from photodetectors 62 and 64, which may comprise conventional phototransistors or photodiodes. Since in the present embodiment the data coding is an extension of the clock coding, varying the rate of insertion of the card into the reader merely changes the clock rate, and data and clock channels 58 and 60 respectively remain in synchronization regardless of changes in the clock rate.

Figure 3:
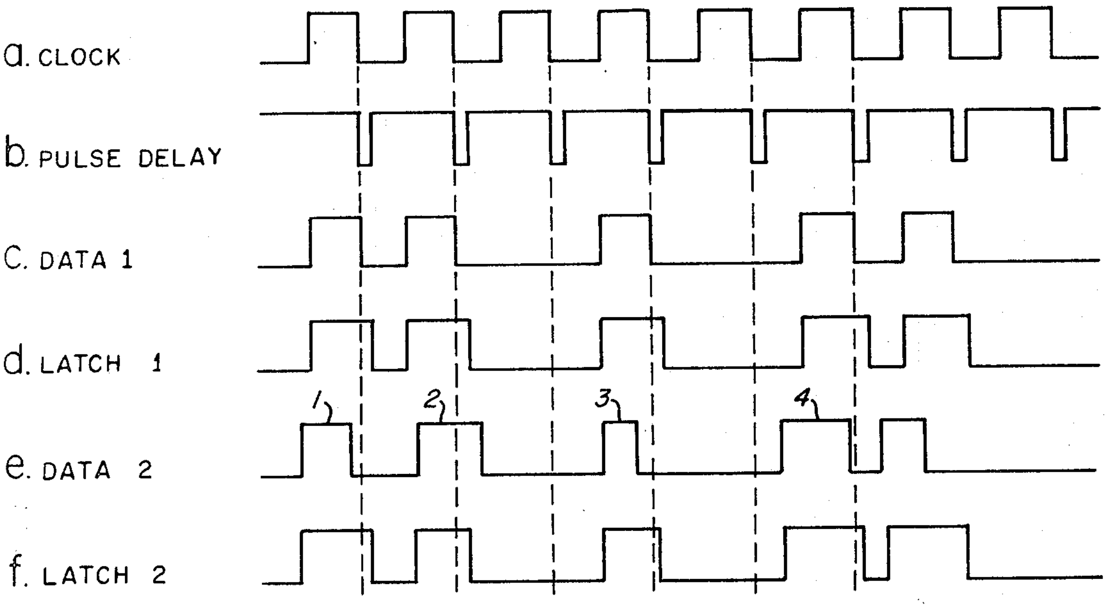
FIG. 3 is a series of waveforms of the various signals generated throughout the disclosed embodiment.

Waveform ($a$) of FIG. 3 is representative of the clock pulses generated by the clock mark indicia passing by photodetector 62 as shown in FIG. 4. Data coding, occuring on certain of the clock indicia generate pulses which are illustrated by waveform ($c$) of FIG. 3 and which occur simultaneously with clock pulses 3$a$. Since there is no internal clock due to the self-synchronization inherent in the system, clock pulses from the output of photodetector 62 in the clock channel 60 are amplified in preamplifier 66 of conventional design while data pulses from the output of photodetector 64 in the data channel 58 are amplified in preamplifier 68 also of conventional design.

Coincident with the negative going trailing edge of the clock pulses, a delay circuit 70 to which the amplified clock pulses are fed from preamplifier 66, produces a delayed pulse of approximately 50 microsecond duration as illustrated by waveform 3($b$). Pulse delay circuit 70 may effectively comprise a one-shot multivibrator of well known and conventional design.

A latching circuit 72 which may effectively comprise an astable multivibrator of well known and conventional design is set by the leading edge of the amplified data pulses illustrated by waveform 3($c$) from preamplifier 68, thereby creating a logical "one" condition as illustrated by waveform 3($d$) when data is present and a logical 0 condition when no data is present, and the latching circuit 72 is not set.

The data output from latching circuit 72 is gated through a switch 76 to the serial input of a shift register 78, which in the present embodiment is a 32 bit shift register to accomodate the 32 clock bits which are generated by 32 coded indicia on the data card. The shift register acts as a buffer to permit the transfer of data which is received by the shift register at different rates to a computer 80 at a different and preferably much faster clock rate as will be explained.

The output of pulse delay circuit 70 in the clock channel is applied to the clock input of shift register 78 through switch 74, which comprises logic circuitry such as dual NAND gates, and is used to clock the data bits from the data channel through the register. The leading edge of the pulse delay output, waveform 3($b$), shifts data into the register while the trailing edge of the same pulse resets the latching circuit 72 back to the logical zero state.

Waveforms 3($a$) and 3($c$) are illustrative of ideal clock and data pulse trains respectively. In actuality, the clock pulses may be somewhat ahead of or behind the data pulses, or wider or more narrow than the data pulses. Data as it would actually occur in a real system is shown by waveform 3($e$). Data irregularities are caused by several factors, among which are differences in sensitivity of the photodetectors 62 and 64 and fuzziness in the quality of the printed coding indicia on the data card which would result in a misalignment of clock and data coding, resulting in clock pulses which would cause register 78 to shift between data pulses with a resultant loss of data bits. This problem is overcome by the pulse delay and latching circuits 70 and 72 respectively.

The first data pulse of waveform 3($e$) is illustrative of the situation when a data pulse occurs before a clock pulse. Without a latching effect the leading edge of waveform 3(*b*) would occur after the 3(*e*)(1) had passed, thus a reading error into the register would occur. The ideal latch output illustrated by waveform 3(*d*) is set by the leading edge of the data pulses, and then remains set even when data disappears or a logical 0 appears, thus staying in the logical "one" position until the data is shifted into the register, and the duration of the data pulse is extended to coincide with suitable clocking as shown by waveform **3(*f*). The case in which a clock pulse occurs before a data pulse which is illustrated by waveform 3(*e*)(2)**. The data pulse 3(*e*)(2) sets the latch and the leading edge of the pulse delay shifts the latch output into the register while the trailing edge of the pulse delay output resets the latch.

In the case in which the data pulse is narrow with respect to the clock pulse, illustrated by waveform 3(*e*)(3), data would be lost before the clock arrival time which is essentially the same difficulty as in the situation illustrated by pulse 3(*e*)(1), namely the occurrence of a data pulse before the presence of a clock pulse and it is corrected in the same manner by latching circuit 72. Similarly, in a case in which the data pulse is wide with respect to the clock pulse, illustratively shown by waveform **3(*e*)(4), the same difficulty is present as in the situation described with respect to pulse 3(*e*)(2), namely the clock pulse arrives before the data pulse, and correction is accomplished in the same manner as with respect to the 3(*e*)(2)** pulse situation.

As previously described, the clock rate is variable since it is a function of the speed with which the indicia on a coded data card inserted into the card reader and passed by the photodetector 62 is sensed. This variable clock rate is one input to switch 74, the other input being the clock speed of computer 80, which of course is the speed at which data may be gated into the computer memory. When all 32 bits of the clock have gated all of the data associated therewith through switch 76 into shift register 78, switch 74 gates the computer clock through to register 78 rather than the clock from clock channel 60 and data present in the shift register is gated into computer 80 at the second data rate which is that of the computer.

In the event that for any reason computer 80 either cannot accept or is unable to accept data from shift register 78, a recirculating loop is provided from the output of shift register 78 through switch 76 and back to shift register 78; thus data from the data channel 58 cannot be fed to register 78 while data already therein is being recirculated. When computer 80 is ready to accept this recirculated data, the data is clocked through shift register 78 by switches 74 and 76 and to permit data from the data channel to be clocked through and into register 78 to either be fed to computer 80 or to be recirculated. Thus, clocks of two different speeds with two different sources are used to run the same shift register.

A self-check feature is provided by counter 82 which is a 32 bit counter which counts the clock pulses as they leave clock pulse delay circuit 70. In the event that a card is picked up or not pushed completely through the reader, all 32 clock pulses and the data associated therewith would not be detected, or in the event that a faulty card is present and all 32 clock pulses are not printed thereon, counter 82 prevents data from being transferred through switch 76 to register 78 and no false data output is generated. If the count is correct, counter 82 feeds through switch 74 and resets register 78. Of course, any desired count may be inputted to counter 82 via a connection from computer 80, dependent only upon the purpose intended. Also, other control circuitry than a pulse counter may be employed. The output of the computer is used to feed a utilization device 84 which may effectively be a data display or a ticket printer or other peripheral equipment.

Switch 74 could alternatively be set to couple clock channel 60 clock pulses independent of counter 82 control and reset to couple computer clock pulses from computer 80. Likewise, switch 76 could alternatively be made independent of control by counter 82 and could be set to couple data from data channel 58 until reset from the computer 80 to provide recirculation of data present in the shift register 78. While switches 74 and 76 are NAND gates, the details of driving a single shift register with two clocks from two different sources is more completely described in the aforementioned copending application of John L. Searle.

Referring now to FIGS. 4 and 5 there is shown a reading head of the type embodied in the present card reader system.

An interrogating element 30, preferably a data card with coded indicia 37 printed thereon which may effectively be black ink or a nonreflecting substance is passed in front of two photodetectors 62 and 64 for detecting clock and data information respectively. The card is effectively paper which reflects light such that photodetectors 62 and 64 will sense reflected light from the card 30, but not from the portion of the card on which the non-reflecting clock and data indicia 32 are present. The positioning of photodetectors 62 and 64 with respect to the coded indicia 32 is illustrated by the cutaway portion 34 of the card 30. When a card is inserted into the card reader for interrogation, it is inserted vertically so as to always present coding on the same level to the photodetectors. The coding is preferably printed on the lower edge of the card as illustrated, and the card may effectively rest on a ledge 46 to accomplish a level feed when a card is pushed through by hand as, for example, in the case in a boarding pass reader for airline use.

FIG. 4 is a cutaway of FIG. 5 along line 4-4 and ledge 36 is the lower portion of an opposing wall 38 which serves to keep the card vertical and the indicia aligned with respect to photodetectors 62 and 64, with the clock indicia aligned with respect to photodetector 62 and the data indicia aligned with respect to photodetector 64.

The reading head 40 of the embodiment shown may effectively be a block of transparent lucite with an opaque or black external coating 42 which results in an edge lighting effect when light from a lighting element 44, which may be a conventional bulb, is diffused through the lucite block 40 where it exits at an uncoated area 46 surrounding photodetectors 62 and 64. The photodetectors are able to read the optical code since the photodetector elements, which may for example comprise phototransistors are also opaquely coated with coatings 48 and 49 respectively, so that no light diffused through the lucite will impinge thereon, but only light which exits from the lucite block 46, passes through to the card 30 and is reflected from the card 30 to the photosensitive surfaces 51 and 52 of photodetectors 62 and 64 respectively will be detected. Thus, the diffused reflected light allows the reading of the low contrast coding on the card. Of course, fiber optics could be employed for reading an embossed code and a magnetic reading head for reading a magnetic code if desired; however, for a practical optical system, the illumination provided by edge lighting if the type disclosed in an optical card reader provides uniform and improved operation. Of course, if desired, block, 40 could be of a flexible material.

Lighting element 44 includes an opaque cap 53 to contain all of the light within the lucite block 40, with terminals 54 and 55 connected to the positive and negative terminals respectively of a battery 56.

The indicia 32 printed on card 30 as previously described are used to generate the clock frequency which is variable depending upon the speed with which the card is pushed through the card reader in front of photodetector 62 and 64 and upon the spacing between the indicia 32, thereby providing a variable clock frequency without internal clock generation circuitry since the bottom portions 57 of indicia 32 are used as the data input to the card reader. Since these indicia block reflected light to the photodetectors it will be seen from FIG. 4 that photodetector 62 will generate a clock pulse when any one of indicia 32 pass therebefore, while photodetector 64 will generate a data pulse only when the lower portions 57 of indicia 32 pass therebefore. From the foregoing, it may be seen that no internal clock and data synchronization circuitry is necessary and that automatic synchronization is provided by the clock and data indicia arrangement since no matter how the clock rate may vary as the card is pushed through the reader, the data rate will vary exactly with the clock rate since the clock and data indicia as printed constitute different portions of the same code marks. The outputs 58 and 59 of photodetectors 62 and 64 are fed to a clock channel and a data channel respectively, as described with reference to FIG. 2.

Figure 6:
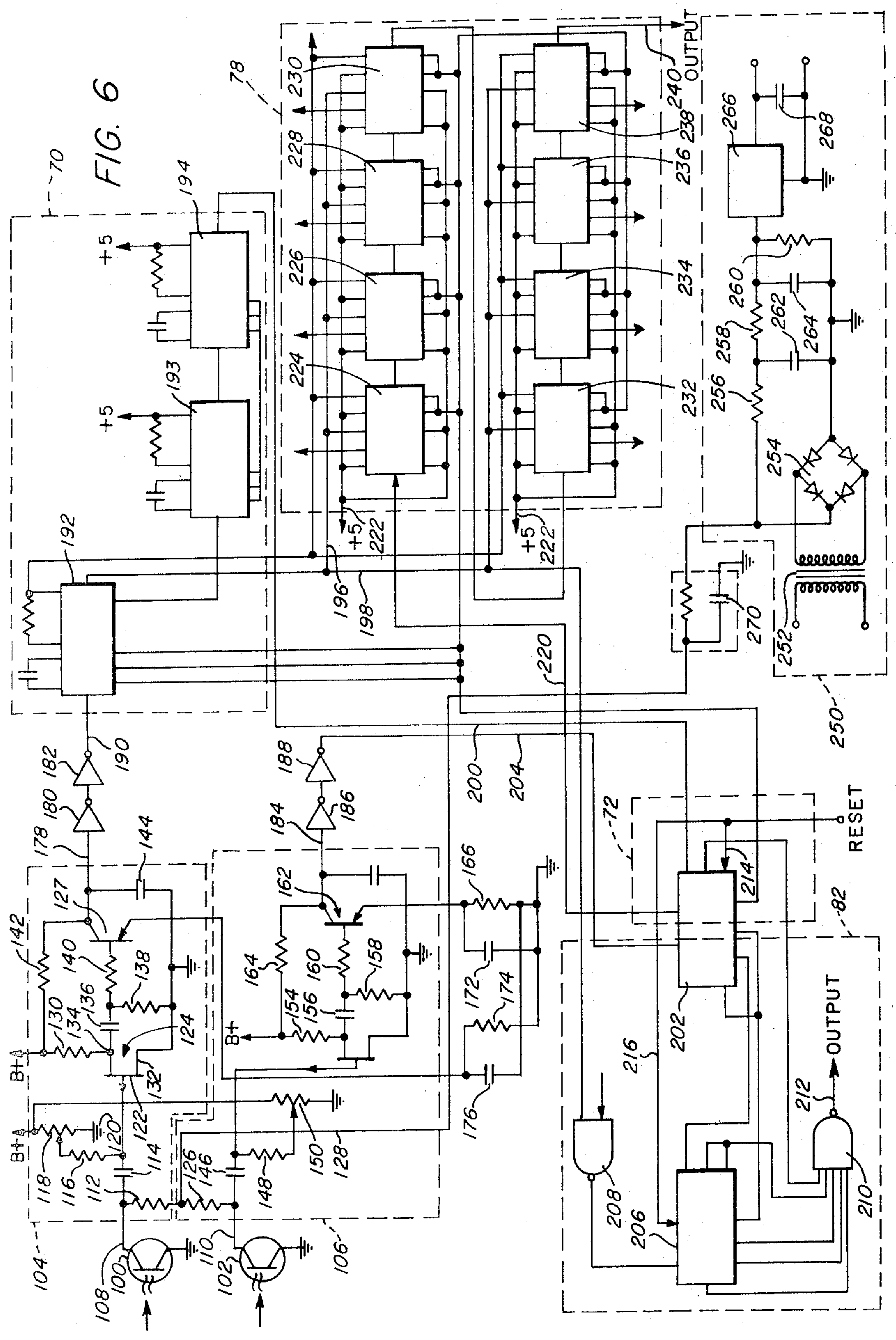
FIG. 6 is a circuit diagram of a card reader in accordance with the principles of the present invention.

Referring now to FIG. 6, a circuit diagram of a card reader system in accordance with the principles of the present invention is illustrated wherein parallel outputs from shift register 78 may be used to form a simple code which when compared in a conventional code comparator or when used to actuate a set of ordinary mechanical switches may be utilized, for example, in an airlines boarding operation to operate a turnstile through which passengers pass prior to boarding an airplane.

Clock and data input information is sensed from the data card coding by phototransistors 100 and 102 respectively with clock pulses being coupled via line 108 to a two stage clock pulse preamplifier shown generally at 104 and with data pulses being coupled via line 110 to a similar two stage data pulse preamplifier shown generally at 106. Preamplifiers 104 and 106 are dual stage FET preamplifiers present a high input impedance, generally in excess of 5 megaohms with a gain of about 100.

The clock pulses on line 108 are fed through filter capacitor 114 and a biasing network comprising resistors 112 and 126 which is supplied 16 volts on a $B^+$ line 128, and resistor 116 and potentiometer 118 which is grounded at 120 to the gate 122 of FET 124 which is the first stage of preamplifier 104, with transistor 127 comprising the second stage. The source of FET 124 is biased by bias resistor 130 and the drain 132 is grounded. The output signal from source 134 of FET 124 is coupled through a biasing and filter network comprising capacitor 136 and resistors 138 and 140 to the base of transistor 127 which is biased through resistor 142. Output filtering is provided by capacitor 144.

Data pulses on line 110 are coupled through ripple filter capacitor 146 and a biasing network of resistors 148 and 150 to the gate of FET 152, the source of which is biased through biasing resistor 154 with the drain grounded. The output of FET 152 is filtered in a filter network comprising filter capacitor 156 and resistors 158 and 160 and is coupled to the base of transistor 162 which is the second stage of the data pulse preamplifier 106. Resistor 164 serves to bias the collector of transistor 162 while the emitter is grounded through resistor 166. A filter network comprising resistor 166 and capacitor 172 provides additional filtering for the output of transistor 162 while another filter network comprising resistor 174 and capacitor 176 provide additional filtering for the output of transistor 127 of the clock pulse preamplifier.

The amplified clock pulses are coupled via line 178 to inverters 180 and 182 to sharpen the leading and trailing edges of the clock pulses before coupling to the pulse delay circuit 70. Similarly, the amplified data pulses are coupled via line 184 to inverters 186 and 188 before coupling to the latching circuit 72. Inverters 180, 182, 186 and 188 are of conventional design, and may be for example, Texas Instrument standard component number Ser. No. 7,404.

Sharpened clock pulses are coupled via line 190 to the pulse delay circuit 70 which comprises three one-shot multivibrators 192, 193 and 194 which, may be, for example Texas Instrument standard component numbers Ser. No. 74,121 and generate the waveform of FIG. 3(*b*) which is coupled via line 196 to shift register 78 and via line 198 to the 32 bit counter 82. The output of multivibrator 194 is coupled via line 200 to reset the latching circuit 72, which in the present embodiment comprises one half of a dual JK flip flop 202, the other half of which is used in the counter circuit, and which may be, for example, Texas Instrument standard component number Ser. No. 7,473.

Sharpened data pulses are coupled via line 204 from inverters 186 and 188 to a conventional JK flip flop 202 which along with element 206, a 4-bit counter, which may be, for example, Texas Instruments standard component number Ser. No. 7,493 will generate the required count. NAND gates 208 and 210, which may be, for example, Texas Instrument standard component numbers Ser. No. 7,400 and Ser. No. 7,430 respectively, are connected such that NAND gate 210 will generate an output pulse on line 212 which can, for example, light an indicator if an improper count is made. The counter is reset after completion of a correct count via lines 214 and 216, which reset signal may be derived from a computer or from other devices as desired.

Data pulses are coupled via line 220 after latching to the shift register 78, with waveform f of FIG. 3 being present on line 220 and standard 5 volt logic biasing on line 222 to the individual flip flops 224, 226, 228, 230, 232, 234, 236 and 238 of shift register 78. The flip flops may be, for example, Texas Instrument standard component number Ser. No. 7,495.

The output of shift register 78 may be serially shifted into a computer on line 240 or parallel transferred as shown by arrow to a code comparator of conventional design for comparing the code present in the register to a predetermined code, for example, to operate a turnstile. Alternatively, the parallel output could be coupled to a plurality of ordinary mechanical switches for controlling any desired utilization device.

Preamplifier and logic voltages are derived from a conventional power supply shown generally at 250. An ac input is coupled through a transformer 252, the output of which is rectified by a full wave rectifier 254. Resistors 256, 258 and 260 and capacitors 262 and 264 provide ripple filtering prior to regulation by regulator 266, which may be, for example, Texas Instruments standard component number LM 209. Additional filtering is provided by capacitors 268 and 270.

The beforementioned standard components are commerically available, and the technical details thereof are published in standard specification.

Referring now to FIG. 7, a logic circuit is shown generally at 280 which allows data to be clocked into a shift register such as register 78 at a first clock rate and then shifted out of the register at a second and different clock rate into anotehr shift register as illustrated or into a computer such as computer 80.

Clock one and two both at different frequencies, are fed into first and second NAND gates 284 and 282 respectively. The output of NAND gates 284 and 282 are coupled to the inputs of a third NAND gate 286, the output of which will switch to the second clock rate from the first upon receipt of a control signal which is inputted to the other input gate of NAND gate 282 and inverted in inverter 290 and inputted to the other input of NAND gate 284. Thus, clock 1 of FIG. 7 may be the clock rate of clock channel 60 of FIG. 2 and clock 2 may be the rate at which data is shifted into computer 80.

While particular embodiments of the invention have been shown and described, various modifications thereof will be apparent to those skilled in the art. For example, by adding additional latching circuits and shift registers, several data tracks may be read simultaneously. Also, the surface opposite the reading head may be depressed to avoid particulate accumulating from the insertion of many data cards since the background should have substantially the same reflectance as the card. Additionally, a greater amount of diffused light may be obtained by providing a white coating on the transparent medium under the opaque coating. Therefore it is not intended that the invention be limited to the disclosed embodiments or to details thereof and departures may be made therefrom within the spirit and scope of the invention as defined in the appended claims.

What is claimed is:

1. A reader system comprising:

a manually positionable element, said element having a first series of markings and a second series of markings; and means for receiving said element, said receiving means being adapted to permit manual insertion therein of said element, said receiving means comprising:

first reading means positioned for reading said first series of markings;

second reading means positioned for reading said second series of markings;

means coupled to said first reading means for storing data represented by said first series of markings; and means coupled to said second reading means for clocking said data into said storage means;

said second reading means including means for providing a pulse delayed from a reading of said second series of markings, said storing means comprising means coupled to said delay means and to said first reading means for forming a pulse which is terminated by said delayed pulse and which corresponds to a mark of said first series of markings, said storage means further comprising a shift register and means for switching selectively pulses from said pulse forming means and from an output of said shift register to an input of said shift register to permit recirculation of pulses stored within said shift register, and said storing means including means for selectively switching pulses from said delay means and from an external source of clock pulses to said shift register for clocking data through said shift register.

2. The system according to claim 1 further comprising means coupled to said storage means for extracting said stored data; and means coupled to said extracting means for displaying said data, said clocking means providing a clock pulse for each marking of said second series of markings.

3. A system according to claim 1 wherein said receiving means comprises:

a source of radiant energy; and means for guiding said radiant energy towards said element for illuminating said element when said element is inserted in said receiving means.

4. A system according to claim 3 wherein illuminating energy is reflected from said element, and wherein said first and said second reading means comprise means positioned for detecting said reflected radiant energy.

5. A system according to claim 4 wherein said guiding means has a recess for said insertion of said element, and wherein said guiding means supports said source of radiant energy and said detecting means.

* * * * *